United States Patent
Liao

(10) Patent No.: US 7,266,417 B2
(45) Date of Patent: Sep. 4, 2007

(54) SYSTEM AND METHOD FOR SEMICONDUCTOR MANUFACTURING AUTOMATION

(75) Inventor: Yuan-Li Liao, Daya Township, Taichung County (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 178 days.

(21) Appl. No.: 10/934,171

(22) Filed: Sep. 3, 2004

(65) Prior Publication Data

US 2006/0052897 A1 Mar. 9, 2006

(51) Int. Cl.
*G06F 19/00* (2006.01)
(52) U.S. Cl. .................... 700/108; 700/90; 700/100
(58) Field of Classification Search ............... 700/100, 700/104, 108, 109, 116, 117, 121, 101, 102, 700/115; 702/84; 718/1, 100, 101, 102, 718/103
See application file for complete search history.

(56) References Cited

U.S. PATENT DOCUMENTS

| | | | | |
|---|---|---|---|---|
| 4,896,269 A | * | 1/1990 | Tong | 700/101 |
| 5,623,404 A | * | 4/1997 | Collins et al. | 705/9 |
| 5,751,581 A | * | 5/1998 | Tau et al. | 700/115 |
| 5,841,660 A | * | 11/1998 | Robinson et al. | 700/115 |
| 5,889,674 A | * | 3/1999 | Burdick et al. | 700/121 |
| 6,496,746 B2 | * | 12/2002 | Jevtic | 700/100 |
| 6,748,287 B1 | * | 6/2004 | Hagen et al. | 700/99 |
| 6,813,534 B2 | * | 11/2004 | Sui et al. | 700/121 |
| 6,865,434 B1 | * | 3/2005 | Lin et al. | 700/108 |
| 6,889,178 B1 | * | 5/2005 | Chacon | 703/6 |
| 6,952,656 B1 | * | 10/2005 | Cordova et al. | 702/117 |
| 6,959,226 B2 | * | 10/2005 | Hsieh | 700/115 |
| 6,963,785 B2 | * | 11/2005 | Chen et al. | 700/100 |
| 7,006,885 B2 | * | 2/2006 | Chen | 700/102 |
| 2003/0236718 A1 | * | 12/2003 | Yang et al. | 705/28 |
| 2004/0001619 A1 | * | 1/2004 | Tai et al. | 382/141 |
| 2004/0015969 A1 | * | 1/2004 | Chang | 718/100 |
| 2004/0053429 A1 | * | 3/2004 | Muranaka | 438/17 |
| 2004/0138773 A1 | * | 7/2004 | Tomoyasu | 700/108 |
| 2004/0243268 A1 | * | 12/2004 | Hsieh et al. | 700/108 |
| 2004/0254666 A1 | * | 12/2004 | Bonnain et al. | 700/108 |
| 2005/0060212 A1 | * | 3/2005 | Annamaneni et al. | 705/7 |
| 2005/0159911 A1 | * | 7/2005 | Funk et al. | 702/104 |
| 2006/0026549 A1 | * | 2/2006 | Tsao et al. | 716/19 |

* cited by examiner

*Primary Examiner*—Leo Picard
*Assistant Examiner*—Carlos R. Ortiz-Rodriguez
(74) *Attorney, Agent, or Firm*—Haynes and Boone, LLP

(57) ABSTRACT

The present disclosure provides a method and system for semiconductor manufacturing automation. In one example, a method for semiconductor manufacturing automation comprises providing an identification table; defining a scheduled sequence; recording a performed sequence; and issuing a warning, if the scheduled sequence does not match the performed sequence.

20 Claims, 7 Drawing Sheets

| Identification code | Recipe Id |
|---|---|
| 0 | CH3 DAILY PASTE |
| 1 | F8-CONDITION-CH3 |
| 2 | CH4 DAILY PASTE |
| 3 | F8-CONDITION-CH4 |

Fig. 4

| EQPID | Byte1 | Byte2 | Byte3 | Byte4 | Byte5 | Rule |
|---|---|---|---|---|---|---|
| ASPU8-3-1 | 0 | 0 | 1 | 1 | 1 | 00111 |
| ASPU8-4 | 2 | 2 | 3 | 3 | 3 | 22333 |

Fig. 5

|  | Record Symbol | | | | | correct? |
|---|---|---|---|---|---|---|
| ASPU8-3-1 | 0 | 0 | 1 | 1 | 1 | Y |
| ASPU8-4-2 | 2 | 2 | 3 | 3 | 3 | Y |

Fig. 6

|  | Record Symbol |  |  |  |  | Correct? |
|---|---|---|---|---|---|---|
| ASUP8-3-1 | 0 | 1 | 0 | 1 | 1 | N |
| ASUP8-4-2 | 2 | 2 | 3 | 3 |  | N |

SYSTEM AND METHOD FOR SEMICONDUCTOR MANUFACTURING AUTOMATION

BACKGROUND

The present disclosure relates generally to the field of semiconductor manufacturing and, more particularly, to a system and method for semiconductor manufacturing automation.

The semiconductor integrated circuit (IC) industry has experienced rapid growth. Technological advances in IC materials and design have produced generations of ICs where each generation has smaller and more complex circuits than the previous generation. However, these advances have increased the complexity of processing and manufacturing ICs and, for these advances to be realized, similar developments in IC processing and manufacturing have been needed. For example, an IC is formed by creating one or more devices (e.g., circuit components) on a substrate using a fabrication process. As the geometry of such devices is reduced to the submicron or deep submicron level, the IC's active device density (i.e., the number of devices per IC area) and functional density (i.e., the number of interconnected devices per IC area) have become limited by the fabrication process.

Furthermore, as the IC industry has matured, the various operations needed to produce an IC may be performed at different locations by a single company or by different companies that specialize in a particular area. This further increases the complexity of producing ICs, as companies and their customers may be separated not only geographically, but also by time zones, making effective communication more difficult. For example, a first company (e.g., an IC design house) may design a new IC, a second company (e.g., an IC foundry) may provide the processing facilities used to fabricate the design, and a third company may assemble and test the fabricated IC. A fourth company may handle the overall manufacturing of the IC, including coordination of the design, processing, assembly, and testing operations.

BRIEF DESCRIPTION OF THE DRAWINGS

FIG. 4 illustrates an identification table according to one embodiment of the present disclosure.

FIG. 5 illustrates scheduled sequences according to one embodiment of the present disclosure.

FIG. 6 illustrates one verification table according to one embodiment of the present disclosure.

FIG. 7 illustrates another verification table according to one embodiment of the present disclosure.

DETAILED DESCRIPTION

Figure 1:
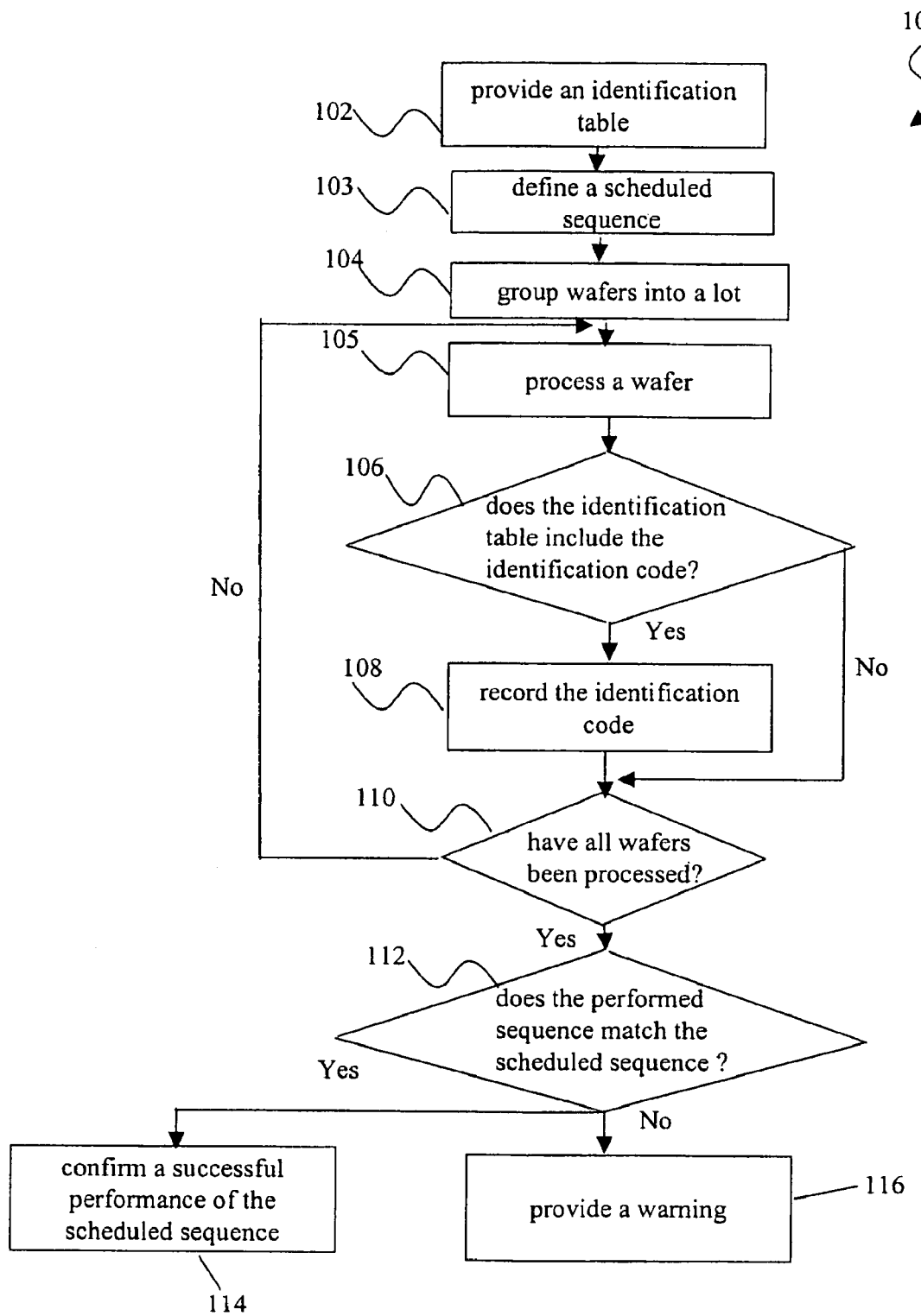
FIG. 1 is a flowchart illustrating a method for semiconductor manufacturing automation according to one embodiment of the present disclosure.

The present disclosure relates generally to the filed of semiconductor manufacturing and, more particularly, to a system and method for semiconductor manufacturing automation.

For the purposes of promoting an understanding of the principles of the invention, references will now be made to the embodiments, or examples, illustrated in the drawings and specific languages will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Semiconductor manufacturing is a complex manufacturing process involving numerous steps that must be executed with great precision. For the sake of example and clarity, only a few steps will be discussed in detail: deposition, patterning and etching. Those processes are repeated on a silicon base, or wafer, resulting in the creation of microscopically thin layers of materials. In the process of creating those layers, a great number of transistors are created and interconnected. As a result, a single wafer may contain hundreds of individual chips that are then cut from the wafer, tested for their electrical properties, packaged and assembled.

In one example, one or more following steps may be adopted and repeated to produce a semiconductor chip: the semiconductor fabrication process is initiated by slicing a wafer from large silicon crystals and polishing it for manufacturing purposes. Then, a special layer of pure silicon crystal, such as Epitaxial Silicon, may grow on the wafer to improve the final chip performance. Later, an insulating layer may be deposited on the wafer to form a thick layer of solid material, and a microscopic circuit pattern may be projected on the wafer surface. Following inspections, which ensure that the circuit pattern does not contain any defect, etching may be performed to create device structures. Thereafter, various steps may be performed to modify characteristics of the deposited films, and procedures such as metal deposition, electroplating, chemical mechanical polishing, and coating may be applied to the semiconductor chip.

For purposes of producing a chip, one or more semiconductor devices are typically arranged on a substrate, which may be a wafer, and wafers are formed into groups, which are known as "lots". The wafers are processed according to a "recipe", which may include a set of instructions for producing a semiconductor chip based on a variety of parameters, including but not limited to, timing specification, temperature, pressure, gas flow and other parameters. Further, the process occurs at a "sequence," which may comprise one or more recipes and steps for operations. For example, a sequence may include information such as (i) orders of operation with respect to a lot, (ii) recipes that may be applied to a lot, (iii) the steps that may be performed by the recipes, and (iv) timing between operations. In other words, a sequence may define certain parameters for wafer processing. For a diffusion furnace, a sequence may include desired temperatures, gas flow rates, process sequencing, and other parameters. For an inspection, a sequence may specify the number of points to be inspected and other information.

Pursuant to previously available methods, identical recipes are applied to wafers that are deposited in a single lot. However, in many instances, it is often desirable to apply different sequences to different wafers residing in the same lot or different lots in a group of lots. Further, it is often desirable to provide a verification system to confirm whether correct recipes/sequences have been applied to a particular wafer or lot.

Referring to FIG. 1, shown therein is a method 100 for semiconductor manufacturing automation according to one embodiment of the present disclosure. The method 100 begins with step 102, which provides an identification table. Step 103 defines a scheduled sequence, step 104 groups wafers into a lot, and step 105 processes a wafer from the lot and removes it from the chamber. Then, step 106 verifies whether an identification code exists in the identification table. If the step 106 verification is successful, the identification code is recorded in a verification table pursuant to step 108. After step 110 confirms that all the wafers have been processed, step 112 verifies whether the recorded sequence in the verification table matches the scheduled sequence. Step 114 confirms a successful operation of the scheduled sequence, while step 116 provides a warning to indicate an erroneous operation of the scheduled sequence. The method 100 will be further described in connections with FIGS. 4-7.

Figure 2:
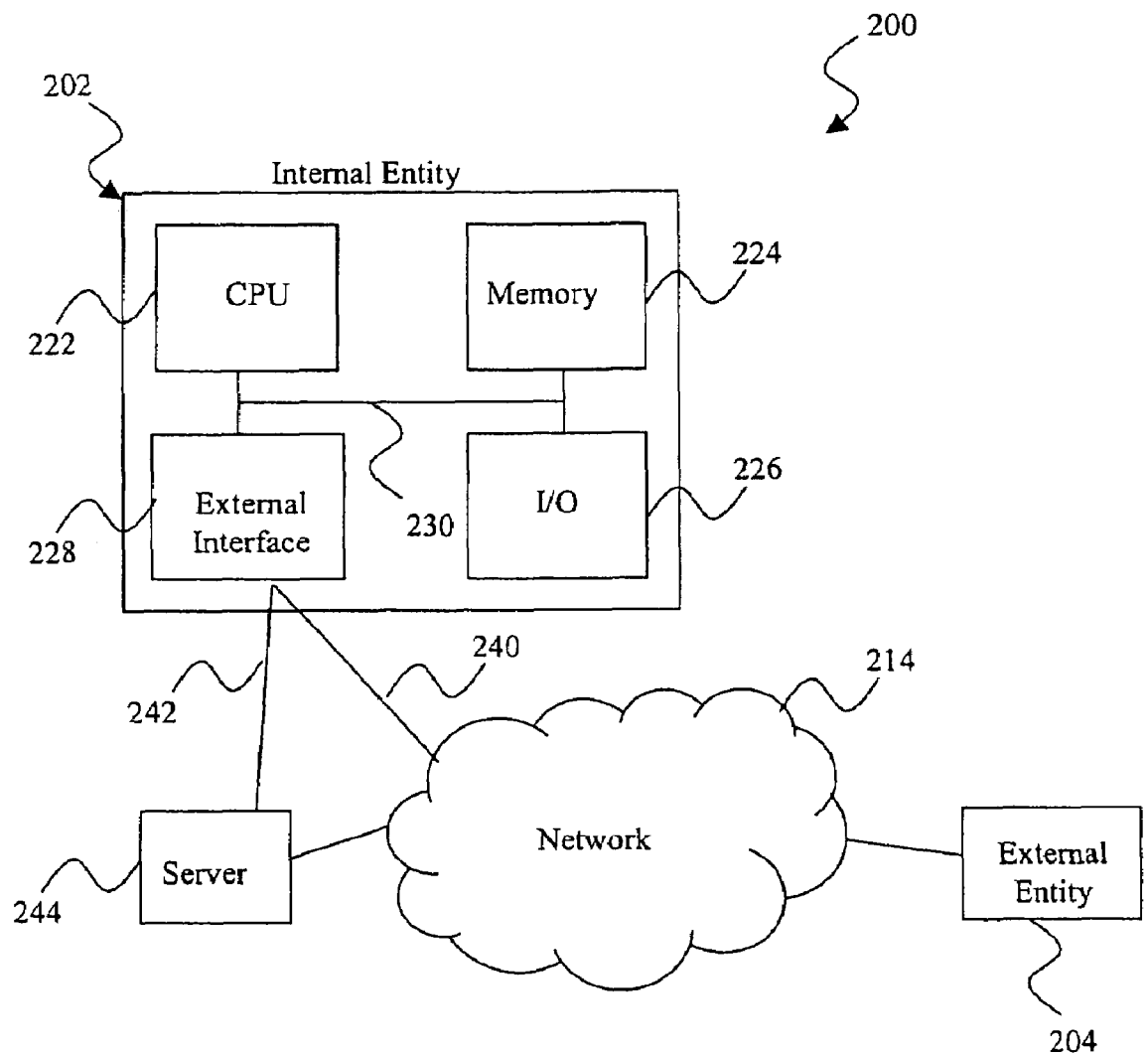
FIG. 2 illustrates a virtual integrated circuit fabrication system that may be used to implement the method of FIG. 1 according to one embodiment of the present disclosure.

Referring now to FIG. 2, shown therein is a virtual IC fabrication system (a "virtual fab") 200 that can be used to implement the method 100 of FIG. 1 according to one embodiment of the present disclosure. The virtual fab 200 includes a plurality of entities, represented by one or more internal entities 202 and one or more external entities 204 that are connected by a communications network 206. The network 206 may be a single network or a variety of different networks, such as an intranet and the Internet, and may include both wireline and wireless communication channels.

Each of the entities 202, 204 may include one or more computing devices such as personal computers, personal digital assistants, pagers, cellular telephones, and the like. For the sake of example, the internal entity 202 is expanded to show a central processing unit (CPU) 222, a memory unit 224, an input/output (I/O) device 226, and an external interface 228. The external interface may be, for example, a modem, a wireless transceiver, and/or one or more network interface cards (NICs). The components 222-228 are interconnected by a bus system 230. It is understood that the internal entity 202 may be differently configured and that each of the listed components may actually represent several different components. For example, the CPU 222 may actually represent a multi-processor or a distributed processing system; the memory unit 224 may include different levels of cache memory, main memory, hard disks, and remote storage locations; and the I/O device 226 may include monitors, keyboards, and the like.

The internal entity 202 may be connected to the communications network 214 through a wireless or wired link 240, and/or through an intermediate network 242, which may be further connected to the communications network. The intermediate network 242 may be, for example, a complete network or a subnet of a local area network, a company wide intranet, and/or the Internet. The internal entity 202 may be identified on one or both of the networks 214, 242 by an address or a combination of addresses, such as a media control access (MAC) address associated with the network interface 228 and an internet protocol (IP) address. Because the internal entity 202 may be connected to the intermediate network 242, certain components may, at times, be shared with other internal entities. Therefore, a wide range of flexibility is anticipated in the configuration of the internal entity 202. Furthermore, it is understood that, in some implementations, a server 244 may be provided to support multiple internal entities 202. In other implementations, a combination of one or more servers and computers may together represent a single entity.

In the present example, the internal entities 202 represents those entities that are directly responsible for producing the end product, such as a wafer or individually tested IC devices. Examples of internal entities 202 include an engineer, customer service personnel, an automated system process, a design or fabrication facility and fab-related facilities such as raw-materials, shipping, assembly or test. Examples of external entities 204 include a customer, a design provider; and other facilities that are not directly associated or under the control of the fab. In addition, additional fabs and/or virtual fabs can be included with the internal or external entities. Each entity may interact with other entities and may provide services to and/or receive services from the other entities.

It is understood that the entities 202-204 may be concentrated at a single location or may be distributed, and that some entities may be incorporated into other entities. In addition, each entity 202, 204 may be associated with system identification information that allows access to information within the system to be controlled based upon authority levels associated with each entities identification information.

The virtual fab 200 enables interaction among the entities 202-204 for purposes related to IC manufacturing, as well as the provision of services. In the present example, IC manufacturing can include one or more of the following steps:

receiving or modifying a customer's IC order of price, delivery, and/or quantity;

receiving or modifying an IC design;

receiving or modifying a process flow;

receiving or modifying a circuit design;

receiving or modifying a mask change;

receiving or modifying testing parameters;

receiving or modifying assembly parameters; and receiving or modifying shipping of the ICs.

One or more of the services provided by the virtual fab 200 may enable collaboration and information access in such areas as design, engineering, and logistics. For example, in the design area, the customer 204 may be given access to information and tools related to the design of their product via the fab 202. The tools may enable the customer 204 to perform yield enhancement analyses, view layout information, and obtain similar information. In the engineering area, the engineer 202 may collaborate with other engineers 202 using fabrication information regarding pilot yield runs, risk analysis, quality, and reliability. The logistics area may provide the customer 204 with fabrication status, testing results, order handling, and shipping dates. It is understood that these areas are exemplary, and that more or less information may be made available via the virtual fab 200 as desired.

Another service provided by the virtual fab 200 may integrate systems between facilities, such as between a facility 204 and the fab facility 202. Such integration enables facilities to coordinate their activities. For example, integrating the design facility 204 and the fab facility 202 may enable design information to be incorporated more efficiently into the fabrication process, and may enable data from the fabrication process to be returned to the design facility 204 for evaluation and incorporation into later versions of an IC.

Figure 3:
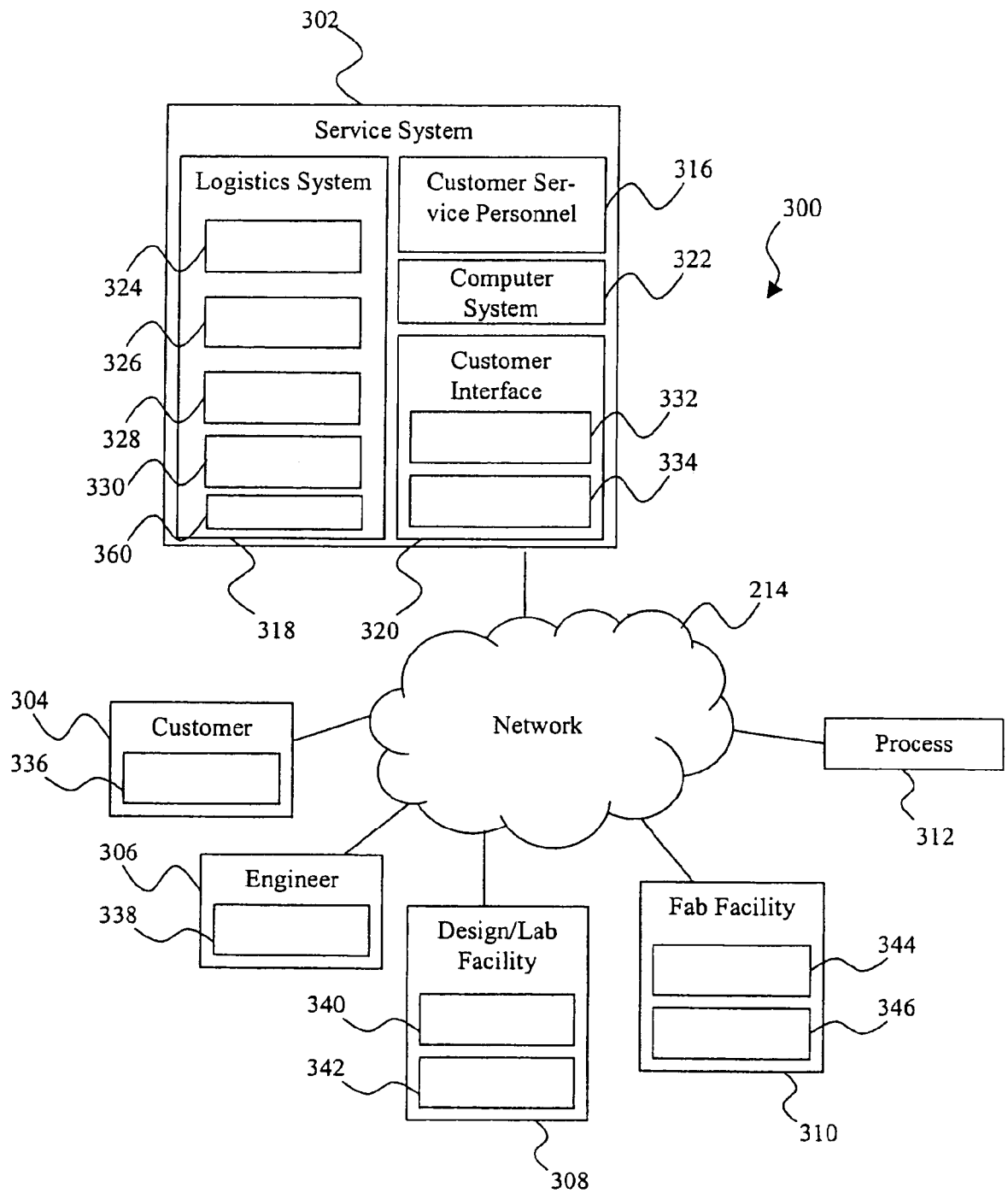
FIG. 3 illustrates a more detailed example of the virtual integrated circuit fabrication system of FIG. 2 according to one embodiment of the present disclosure.

Referring now to FIG. 3, shown therein is a more detailed virtual fab 300 according to one embodiment of the present disclosure. The virtual fab 300 may include some or all of the components discussed above with respect to the virtual fab 200 (FIG. 2). It is understood, that by providing two examples of virtual fabs 200, 300, other examples can readily provided.

The virtual fab 300 includes a plurality of entities 302, 304, 306, 308, 310, and 312 that are connected by a communications network 314. In the present example, the entity 302 represents a service system, the entity 304 represents a customer, the entity 306 represents an engineer, the entity 308 represents a design/lab facility for IC design and testing, the entity 310 represents a fab facility, and the entity 312 represents a process (e.g., an automated fabrication process) either inside the fab 310, or at another facility. Each entity may interact with other entities and may provide services to and/or receive services from the other entities.

The service system 302 provides an interface between the customer and the IC manufacturing operations. For example, the service system 302 may include customer service personnel 316, a logistics system 318 for order handling and tracking, and a customer interface 320 for enabling a customer to directly access various aspects of an order.

The logistics system 318 may include a work-in-process (WIP) inventory system 324, a product data management system 326, a lot control system 328, and a manufacturing execution system (MES) 330, and the manufacturing automation system 360 that implements the method 100 of FIG. 1. The WIP inventory system 324 may track working lots using a database (not shown). The product data management system 326 may manage product data and maintain a product database (not shown). The product database could include product categories (e.g., part, part numbers, and associated information), as well as a set of process stages that are associated with each category of products. The lot control system 328 may convert a process stage to its corresponding process steps.

The MES 330 may be an integrated computer system representing the methods and tools used to accomplish production. In the present example, the primary functions of the MES 330 may include collecting data in real time, organizing and storing the data in a centralized database, work order management, workstation management, process management, inventory tracking, and document control. The MES 330 may be connected to other systems both within the service system 302 and outside of the service system 302. Examples of the MES 330 include Promis (Brooks Automation Inc. of Massachusetts), Workstream (Applied Materials, Inc. of California), Poseidon (IBM Corporation of New York), and Mirl-MES (Mechanical Industry Research Laboratories of Taiwan). Each MES may have a different application area. For example, Mirl-MES may be used in applications involving packaging, liquid crystal displays (LCDs), and printed circuit boards (PCBs), while Promis, Workstream, and Poseidon may be used for IC fabrication and thin film transistor LCD (TFT-LCD) applications. The MES 330 may include such information as a process step sequence for each product.

The manufacturing automation system 360 will be further described below in connections with FIGS. 4-7.

The customer interface 320 may include an online system 332 and an order management system 334. The online system 332 may function as an interface to communicate with the customer 304, other systems within the service system 302, supporting databases (not shown), and other entities 306-312. The order management system 334 may manage client orders and may be associated with a supporting database (not shown) to maintain client information and associated order information.

Portions of the service system 302, such as the customer interface 320, may be associated with a computer system 322 or may have their own computer systems. In some embodiments, the computer system 322 may include multiple computers (FIG. 4), some of which may operate as servers to provide services to the customer 304 or other entities. The service system 302 may also provide such services as identification validation and access control, both to prevent unauthorized users from accessing data and to ensure that an authorized customer can access only their own data.

The customer 304 may obtain information about the manufacturing of its ICs via the virtual fab 300 using a computer system 336. In the present example, the customer 304 may access the various entities 302, 306-312 of the virtual fab 300 through the customer interface 320 provided by the service system 302. However, in some situations, it may be desirable to enable the customer 304 to access other entities without going through the customer interface 320. For example, the customer 304 may directly access the fab facility 310 to obtain fabrication related data.

The engineer 306 may collaborate in the IC manufacturing process with other entities of the virtual fab 300 using a computer system 338. The virtual fab 300 enables the engineer 306 to collaborate with other engineers and the design/lab facility 308 in IC design and testing, to monitor fabrication processes at the fab facility 310, and to obtain information regarding test runs, yields, etc. In some embodiments, the engineer 306 may communicate directly with the customer 304 via the virtual fab 300 to address design issues and other concerns.

The design/lab facility 308 provides IC design and testing services that may be accessed by other entities via the virtual fab 300. The design/lab facility 308 may include a computer system 340 and various IC design and testing tools 342. The IC design and testing tools 342 may include both software and hardware.

The fab facility 310 enables the fabrication of ICs. Control of various aspects of the fabrication process, as well as data collected during the fabrication process, may be accessed via the virtual fab 300. The fab facility 310 may include a computer system 344 and various fabrication hardware and software tools and equipment 346. For example, the fab facility 310 may include an ion implantation tool, a chemical vapor deposition tool, a thermal oxidation tool, a sputtering tool, and various optical imaging systems, as well as the software needed to control these components.

The process 312 may represent any process or operation that occurs within the virtual fab 300. For example, the process 312 may be an order process that receives an IC order from the customer 304 via the service system 302, a fabrication process that runs within the fab facility 310, a design process executed by the engineer 306 using the design/lab facility 308, or a communications protocol that facilities communications between the various entities 302-312.

It is understood that the entities 302-312 of the virtual fab 300, as well as their described interconnections, are for purposes of illustration only. For example, it is envisioned that more or fewer entities, both internal and external, may exist within the virtual fab 300, and that some entities may be incorporated into other entities or distributed. For example, the service system 302 may be distributed among the various entities 306-310.

The method 100, which may be predominately performed by the manufacturing automation system 360, will now be further described. The manufacturing automation system 360 may reside within the service system 302, and may comprise one or more software programs that are written in a standard programming language, such as C, C++, or other languages. It is contemplated that the manufacturing automation system 360 may be a separate unit. Alternatively, it may be associated with any of the WIP inventory system 324, the product data management system 326, the lot control system 328, or the MES 330. It is contemplated that the manufacturing automation system 360 may facilitate the fabrication of semiconductor chips by the fab facility 310. It is also contemplate that the manufacturing automation system 360 may interact with any other component of the virtual fab 300. In one example, the customer 304 may rely on the manufacturing automation system 360 to confirm that his order has been processed correctly. In another example, the engineer 306 may communicate with the manufacturing automation system 360 to change recipes that are applied to a wafer or lot. In a third example, the design/lab facility 308 may communicate with the manufacturing automation system 360 to verify the satisfactory operation of the manufacturing processes. In a fourth example, the process 312 may communicate with the manufacturing automation system 360 regarding the processing of certain wafers.

Referring now to FIG. 4, shown therein is an identification table 400 defined by the step 102 of the method 100 according to one embodiment of the present disclosure. In this embodiment, the identification table 400 may comprise two columns: an identification code column 402 and a recipe id column 404. In one example, an identification code 406, which has a value of 0, is assigned to the recipe id 408, which may comprise CH3 Daily Paste. Here, the identification code column 402 may comprise identification codes 406 to 414, which represent continuous numbers. However, it is contemplated that the identification codes 406 to 414 may comprise discontinuous numbers or other symbols. It is also contemplated that the identification table 400 may include a fewer or a greater number of rows and/or columns. Further, it is contemplated that the identification table 400 may contain a plurality of tables, and/or that it may be linked to other tables.

Figure 5:
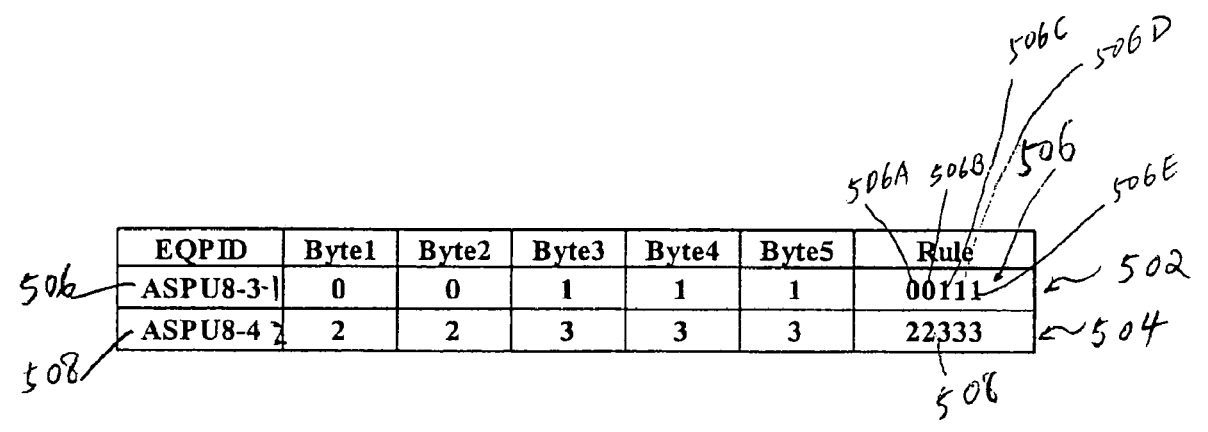

Referring now to FIG. 5, shown therein are sequences 502 and 504 defined by the step 103 of the method 100 according to one embodiment of the present disclosure. In this embodiment, the sequences 502 and 504 may be applied to the wafers placed on lots identified as ASPU8-3-1 and ASPU8-4-2, respectively. The equipment id 506, which is ASPU8-3-1, may represent lot 1, chamber 3 of the eighth ASPU machine on a particular factory floor. However, other methods of identifying a lot are also contemplated. The sequence 502 may comprise a rule 506, which may be 00111 (0 corresponds to CH3 Daily Paste, while 1 corresponds to F8-Condition-Ch3 as illustrated in FIG. 4). Accordingly, wafers 1-5 corresponding to the equipment id 506 will receive the receipts 0, 0, 1, 1, and 1, respectively. Likewise, wafers 1-5 corresponding to the equipment id 508 will receive the receipts 2, 2, 3, 3, and 3, respectively. It is contemplated that a fewer or greater number of wafers may be used to fill a particular lot. It is also contemplated that lots and chambers are exemplary terminologies that are used to identify a specific equipment for processing wafers, and that other types of terminologies are also contemplated.

In one embodiment, five wafers may be loaded into the lot identified by the equipment id 506, and processed pursuant to the sequence 502. The sequence 502 may comprise the rule 506, which may comprise 00111. Then, pursuant to the step 105 of the method 100, the first wafer may be processed with a recipe 506A, which may comprise the identification code 0 and represent the recipe CH3 Daily Paste according to FIG. 4. Later, pursuant to the step 106 of the method 100, the manufacturing automation system 360 may search for the identification code 506A in the identification table 400 of FIG. 4. Since it is able to locate the identification code 506A there and pursuant to the step 108 of the method 100, the manufacturing automation system 360 may record the identification code 506A in a verification table 600 of FIG. 6. Then, pursuant to the step 110 of the method 100, it may proceed to verify whether all the wafers have been processed. Since in this case, not all five wafers have been processed, the steps 105 to 110 may be repeated. Accordingly, the second wafer may be processed with the identification code 506B pursuant to the step 105, and the manufacturing automation system 360 may record the identification code 506B in the verification table 600 of FIG. 6. Likewise, those steps 105 to 110 may be repeated until all five wafers have been processed. By then, the symbol codes 506A to 506E will have been recorded in the verification table 600 of FIG. 6. At that time, pursuant to the step 112, the manufacturing automation system 360 may compare the performed sequence 602 with the scheduled sequence 502, and conclude that since they are identical, the scheduled sequence 502 was performed successfully. Accordingly, pursuant to the step 114 of the method 100, the manufacturing automation system 360 may confirm the successful performance of the scheduled sequence 502 to the operator or other parties through the virtual fab 300.

Referring now to FIG. 7, shown therein is another verification table 700 according to one embodiment of the present disclosure. In this embodiment, the verification table 700 comprises sequences 702 and 704. Here, the performed sequence 702, which comprises 01011, does not match the scheduled sequence 502, which comprises 00111. Therefore, pursuant to the step 116 of the method 100, the manufacturing automation system 360 may provide a warning to the operator of the equipment ASUP-8-3-1. It is also contemplated that the manufacturing automation system 360 may provide the warning to the pertinent customer or other parties through the virtual fab 300.

Although only a few exemplary embodiments of this invention have been described in detail above, those skilled in the art will readily appreciate that many modifications are possible in the exemplary embodiments without materially departing from the novel teachings and advantages of this invention. Also, features illustrated and discussed above with respect to some embodiments can be combined with features illustrated and discussed above with respect to other embodiments. Accordingly, all such modifications are intended to be included within the scope of this invention.

What is claimed is:

1. A method for semiconductor manufacturing automation, comprising:
   providing an identification table;
   defining a scheduled sequence having an identification code;
   verifying that the identification code exists in the identification table;
   performing an automated semiconductor manufacturing sequence after verifying that the identification code exists in the identification table;
   recording the performed sequence; and
   issuing a warning, if the scheduled sequence does not match the recorded sequence.

2. The method of claim 1 wherein the identification table comprises one or more recipes and their corresponding identification codes.

3. The method of claim 1 wherein the defining includes supplying one or more recipes for the scheduled sequence.

4. The method of claim 3 wherein at least two of the one or more recipes are different from each other.

5. The method of claim 1 wherein the recording includes inserting identification codes of recipes into a verification table.

6. The method of claim 1 wherein the issuing comprises notifying a machine operator.

7. The method of claim 1 wherein the issuing comprises notifying a customer through a virtual fab.

8. The method of claim 1 further comprising confirming a successful performance of the scheduled sequence, if the scheduled sequence is identical to the recorded sequence.

9. The method of claim 8 wherein the confirming comprises notifying a machine operator.

10. The method of claim 8 wherein the confirming comprises notifying a customer through a virtual fab.

11. A computer readable medium comprising a plurality of instructions relating to semiconductor manufacturing automation for execution by at least one computer processor, wherein the instructions are for:
   providing an identification table;
   defining a scheduled sequence having an identification code;
   verifying the identification code exists in the identification table;
   performing an automated semiconductor manufacturing sequence;
   recording the performed sequence; and
   confirming a successful performance of the scheduled sequence, if the scheduled sequence is identical to the recorded sequence.

12. The computer readable medium of claim 11 further comprising providing a warning, if the scheduled sequence does not match the recorded sequence.

13. The computer readable medium of claim 11 wherein the defining comprises supplying one or more recipes for the scheduled sequence.

14. The computer readable medium of claim 13 wherein at least two of the one or more recipes are different from each other.

15. The computer readable medium of claim 11 wherein the identification table comprises one or more recipes and their corresponding identification codes.

16. The computer readable medium of claim 11 wherein the recording comprises verifying that a performed recipe exists in the identification table.

17. The computer readable medium of claim 11 wherein the recording comprises inserting a corresponding identification code of a performed recipe into a verification table.

18. A method for semiconductor manufacturing automation, comprising:
   providing an identification table for one or more recipes;
   defining a scheduled sequence for a lot wherein the scheduled sequence includes one or more recipes, and not all of the one or more recipes are identical;
   recording a performed automated semiconductor manufacturing sequence in a verification table; and
   issuing a warning, when the recorded automated semiconductor manufacturing sequence does not match the scheduled sequence.

19. The method of claim 18 further comprising confirming a successful performance of the scheduled sequence, if the recorded sequence is identical to the scheduled sequence.

20. The method of claim 19 wherein each of the one or more recipes is different from each other.

* * * * *